Nov. 11, 1924.   1,514,798
J. J. SIGLER
CONNECTING LINK FOR CHAINS
Filed April 29, 1924
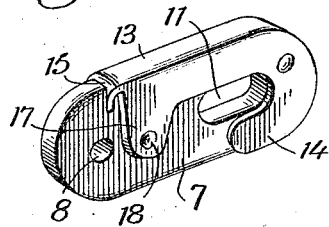
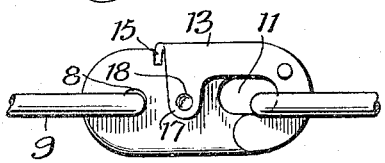
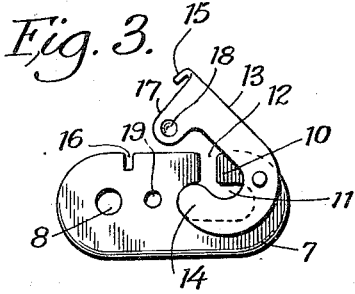
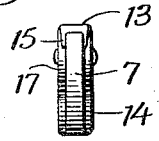
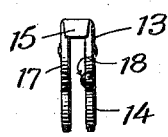
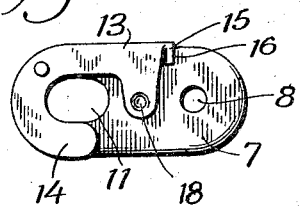

Patented Nov. 11, 1924.

1,514,798

UNITED STATES PATENT OFFICE.

JOHN J. SIGLER, OF FREDERICK, MARYLAND.

CONNECTING LINK FOR CHAINS.

Application filed April 29, 1924. Serial No. 709,794.

*To all whom it may concern:*

Be it known that JOHN J. SIGLER, citizen of the United States, residing at Frederick, in the county of Frederick and State of Maryland, has invented certain new and useful Improvements in Connecting Links for Chains, of which the following is a specification.

The present invention relates to connecting links for chains and consists in the combinations and arrangements of elements hereinafter described and particularly set forth in the accompanying claim.

In the use of antiskid chains for automobile wheels connecting links are employed for holding together the respective ends of the chain and such links are usually provided with locking devices or guards adapted to secure the chain end links thereby securely holding the chain to the wheel tire. The present used connecting links for this purpose are defective in that this guard element becomes displaced due to accumulation of foreign matter between the guard and its link, and, no doubt, due also in a measure to the centrifugal force to which the guard is subjected. Because of this the chain ends become disconnected, and the chain lost or entangled on the wheel.

To avoid these faults the present invention proposes to provide the link guard or locking member with means for securely holding the same in locked position quite regardless of the causes of link displacement above referred to.

The invention is shown by way of illustration in the accompanying drawings wherein:

Figure 1 is a perspective view of the device;

Figure 2 a side elevational view;

Figure 3 a similar view of the link opened;

Figure 4 an end elevation of the link and guard;

Figure 5 an end elevation of the guard per se; and

Figure 6 an elevational view of the opposite side of the link and guard.

Referring to the construction in further detail and wherein like reference characters indicate corresponding parts in the different views shown the connecting link comprises a body portion 7 having, at one end, an aperture 8 to receive the permanent connecting link 9 of the anti-skid chain, and 10 is the hook end for the connecting link of said chain that engages within the recess 11 through the opening 12, as shown.

The guard or locking device consists of a pivotally mounted body portion 13 constructed preferably of sheet metal, and formed to partially embrace or fit over the link 7; and having hooked portions 14 shaped to the form of the hook end 10. Said hook portions 14 are adapted to be engaged by the free end link of the chain, to automatically lock the guard as shown in Figure 2.

This chain construction of connecting chain link and locking member and guard therefor are of well known type and no claim to the same is herein made.

The locking member 13 is provided at its free end with an angular projecting portion 15 designed to engage within the notch 16 formed at one edge of the body portion 7, as shown in Figures 1 and 2, and thereby prevent the ingress of any foreign matter between the link portion 7 and the guard that would otherwise ultimately cause said guard to open on its pivot and permit of release of the attached chain end. In like manner this fitting of the guard end within the link serves to prevent opening of the guard through the action of centrifugal force due to the high rate of turning of the wheel.

An additional means for holding the guard in closed position on the link consists of a detent 18 formed in the side portion 17 of the guard adapted to frictionally engage within the aperture or recess 19 formed in the side of the link 7.

It will be obvious that the devices here provided will effectively hold the guard in closed position on its link, thereby preventing accidental disconnection of the chain end, though permitting of said guard to be easily opened in the usual way for applying the chain end when fitting the antiskid chain to the wheel, or with equal facility to remove the same.

It will be understood, of course, that the invention is not limited to the details of construction and arrangement herein set forth inasmuch as various modifications may be made therein without departing from the invention within the scope of the claim.

Having thus described my invention what I claim as new and desire to protect by U. S. Letters Patent is:—

A connecting link for anti-skid chains comprising a body portion, a locking member pivotally mounted thereon, said body portion having a recess and an adjacent notch formed therein, and an angular projecting portion on said locking member adapted to engage within said notch, and a detent on the locking member adapted to engage within the recess, said detent and notch engaging portion adapted to prevent accidental displacement of the locking member, substantially as set forth.

In testimony whereof I affix my signature.

JOHN J. SIGLER.